United States Patent

Callway

[11] Patent Number: 6,075,574
[45] Date of Patent: Jun. 13, 2000

[54] METHOD AND APPARATUS FOR CONTROLLING CONTRAST OF IMAGES

[75] Inventor: Edward G. Callway, Toronto, Canada

[73] Assignee: ATI Technologies, Inc, Thornhill, Canada

[21] Appl. No.: 09/083,556

[22] Filed: May 22, 1998

[51] Int. Cl.$^7$ ..................................................... H04N 5/57
[52] U.S. Cl. ........................... 348/673; 348/678; 348/687
[58] Field of Search ................................. 348/673, 678, 348/687; H04N 5/57

[56] References Cited

U.S. PATENT DOCUMENTS 5,245,425  9/1993  Klatt.

Primary Examiner—Sherrie Hsia
Attorney, Agent, or Firm—Markison & Reckamp

[57] ABSTRACT

A method and apparatus for controlling contrast of images when displayed on a monitor begins when signals corresponding to an image and a contrast feedback signal are received. The signals are mixed with the contrast feedback signal to produce image output signals. The contrast feedback signal is, in turn, determined based on the contrast level of the image output signals. As such, a closed loop feedback circuit is provided to control the contrast levels of the image output signals.

30 Claims, 6 Drawing Sheets

METHOD AND APPARATUS FOR CONTROLLING CONTRAST OF IMAGES

TECHNICAL FIELD OF THE INVENTION

The present invention relates generally to displaying images and more particularly to controlling contrast of images.

BACKGROUND OF THE INVENTION

It is generally understood that a television is designed to receive and display low resolution, high intensity data while computer monitors are designed to display high resolution, low intensity images. As such, when video images designed for display on a television are displayed on a computer monitor, they appear dull in comparison to when displayed on a television. Similarly, when an image designed for display on a computer display is presented on a television, it looks slightly surreal and slightly distorted.

The distortion in the shape of the graphics data (i.e., data formatted for display on a computer monitor) occurring on a commercial grade television is called blooming. The effects of blooming cause the width of a graphics image to be wider than desired. This typically occurs because a graphics image has a very high average brightness, typically above ninety percent (90%), whereas an average television signal has an average brightness in the range of fifty to seventy percent. Consumer grade televisions are not designed to handle such high brightness signals, resulting in the distortion of the graphic images. Note that high-end televisions do not experience blooming since they are designed to receive video signals that span the entire contrast range (0%–100%). The high-end televisions, however, cost at least twice that of consumer grade televisions.

One solution to reducing the blooming effect when displaying graphic images (e.g., GUI graphics, windows) on a television set is to simply lower the maximum contrast allowed. For example, the maximum contrast may be set to be seventy-five percent (75%) of the total contrast range, insuring that blooming will not occur. This approach works fairly well for graphical images such as windows that contain text, however, it does not work well with displaying DVD images. Because of the reduced contrast, the overall intensity of the DVD images are reduced producing a dull image, especially when compared to the DVD images being displayed on a television. As such, this is an undesirable technique for displaying DVD images.

Another technique for automatic adjusting of the contrast of the television is done based on the ambient lighting of the environment in which a television resides. As ambient lighting decreases, the average brightness of a signal is reduced. Conversely, when the ambient light increases, the average brightness of the signals increases. This automatic adjusting technique, however, was not based on the content of the images being displayed. As such, this technique would not resolve the blooming effect of displaying graphics images on a television.

Therefore, a need exists for a method and apparatus that provides for control of contrast of images based on the image content.

DETAIL DESCRIPTION OF A PREFERRED EMBODIMENT

Generally, the present invention provides a method and apparatus for controlling contrast of images when displayed on a monitor, which may be a television, CRT monitor, LCD monitor, or any other device that is primarily functional to display video images. The controlling process begins when signals corresponding to an image and a contrast feedback signal are received. The signals are mixed with the contrast feedback signal to produce image output signals. The contrast feedback signal is, in turn, determined based on the brightness level of the image output signals. As such, a closed loop feedback circuit is provided to control the contrast levels of the image output signals. With such a method and apparatus, graphic images including DVD images, may be displayed on a television set without blooming of graphic images and without brightness degradation of the DVD images.

Figure 1:
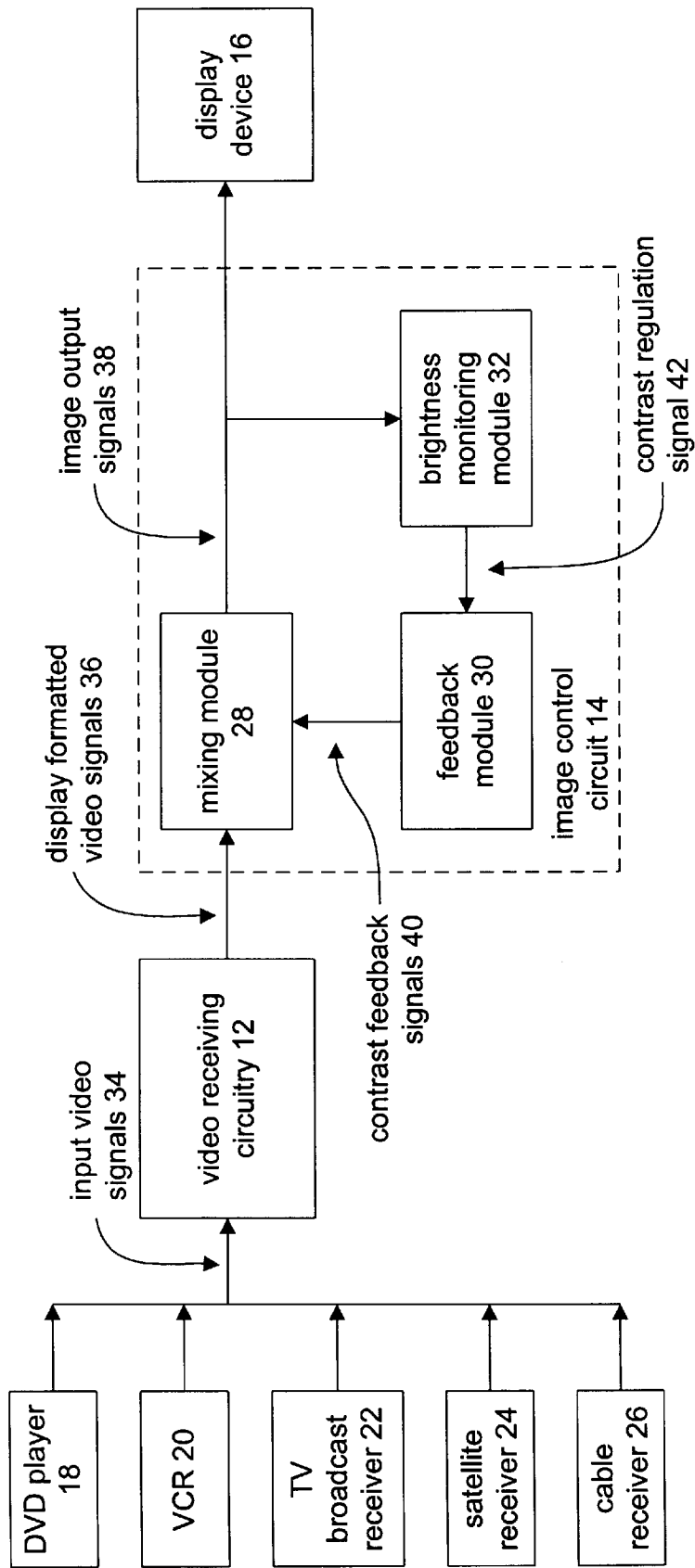
FIG. 1 illustrates a schematic block diagram of a system in accordance with the present invention.

The present invention can be more fully described with reference to FIGS. 1 through 6. FIG. 1 illustrates a schematic block diagram of a video system 10 that includes a video receiving circuit 12, an image control circuit 14, and a display device 16. The video receiving circuit 12 may be a television encoder circuit included in a computer, such as the television encoder contained in the All-In-Wonder board manufactured and produced by ATI Technologies. The video receiving circuit 12 may be operably coupled to receive input video signals 34 from a plurality of different input sources. For example, the input sources may be a DVD player 18, a VCR 20, a television broadcast receiver 22, a satellite receiver 24 and/or a cable receiver 26 or computer graphical images.

Upon receiving the input video signals 34, the video receiving circuit 12 generates display formatted video signals 36. For example, if the display device 16 is a television set, the video receiving circuit 12 produces pixel information in a Pr, Pb, YUV, Y, Cb, Cr, or YC format. Alternatively, if the display device 16 is a computer monitor, a high definition television, the display formatted video signal 36 may be formatted as RGB data.

The image control circuit 14 includes a mixing module 28, a feedback module 30, and a brightness monitoring module 32. As coupled, the modules 28 through 32 of the image control circuit 14 form a closed loop feedback circuit. The brightness monitoring module 32 monitors the image output signals 38 to determine whether the brightness of the image output signals are unfavorable. For example, the brightness monitoring module 32 may compare the brightness of the image output signals 38 with a threshold. The functionality of the brightness monitoring module 32 will be discussed in greater detail with reference to FIGS. 3 and 4. Note that the term 'brightness' refers to the perceived light (e.g. CRT beam current) of a television, wherein 'contrast' refers to the control of the brightness.

If the brightness of the output signals 38 is unfavorable, the brightness monitoring module 32 generates a contrast regulation signal 42. Based on the contrast regulation signal 42, the feedback module 30 generates a contrast feedback signal 40. The mixing module 28 mixes the contrast feedback signal 40 with the display formatted signals 36 to lower the brightness of the image output signals 38. The feedback module 30 will generate a dynamic contrast feedback signal based on the contrast regulation signal. As such, if the brightness of the image output signals are slightly unfavorable, the contrast feedback signal 40 will only lower the contrast slightly. Conversely, if the brightness levels of the image output signal are substantially unfavorably, the contrast feedback signal will substantially lower the contrast of the display formatted video signals 36 to a desired level. As such, the controlling of the contrast levels of the image output signals is dynamic. Thus, when DVD images are displayed, the image control circuit 14 would not adjust the contrast of the DVD images, which typically have an average brightness between thirty percent (30%) and seventy percent (70%). If, however, graphics data is displayed, the image control circuit 14 would lower the contrast of the graphics data, which typically have an average brightness in excess of seventy-five percent (75%).

Figure 2:
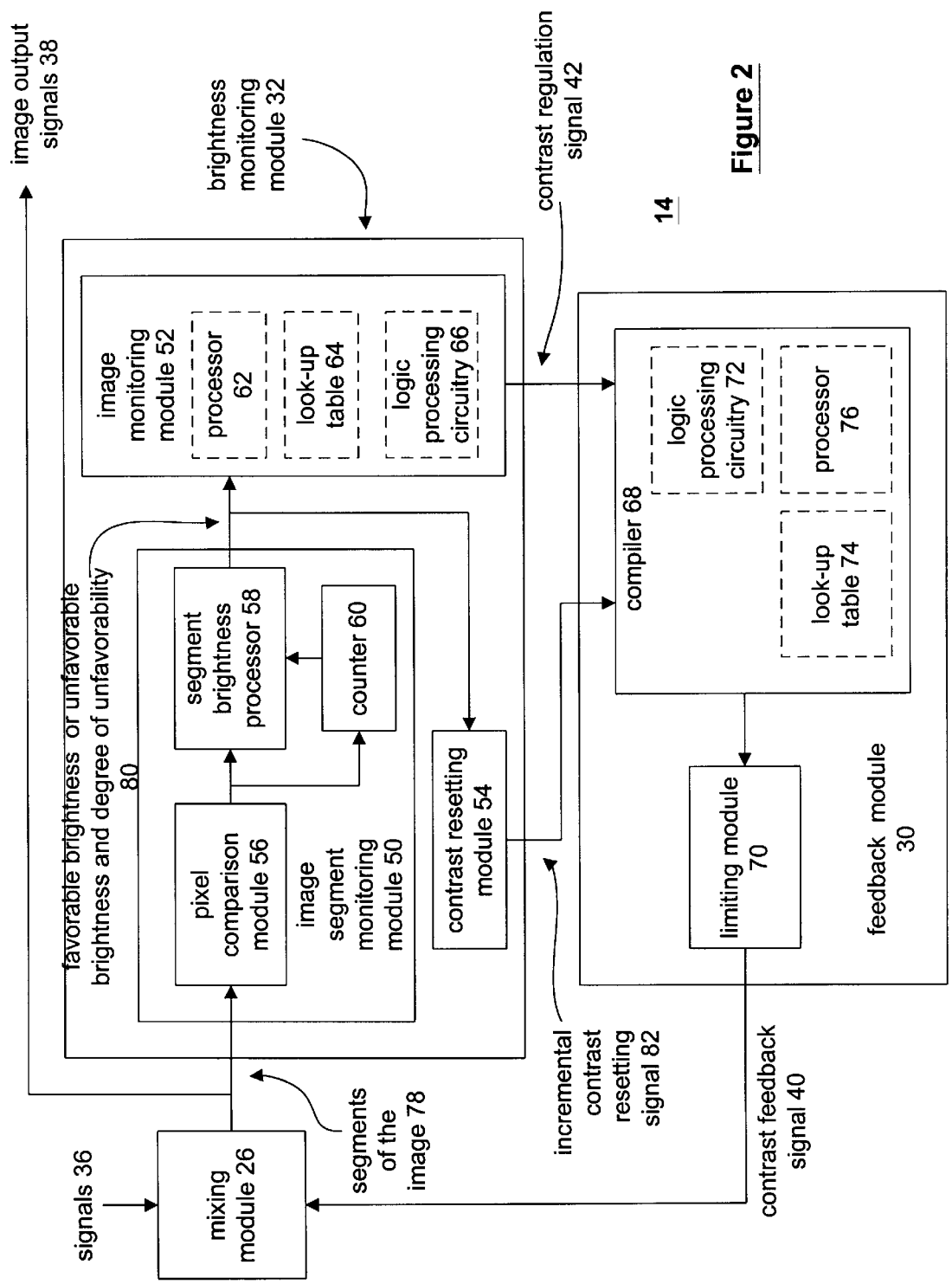
FIG. 2 illustrates a schematic block diagram of an image control circuit of FIG. 1.

FIG. 2 illustrates a more detailed schematic block diagram of the image control circuit 14. As shown, the brightness monitoring module 32 includes an image segment monitoring module 50, an image monitoring module 52, and a contrast resetting module 54. The image segment monitoring module 50 includes a pixel comparison module 56, a segment brightness processor 58, and a counter 60. The image monitoring module 52 includes a processor 62, a lookup table 64, and/or logic processing circuitry 66.

The image segment monitoring module 50 is operably coupled to receive segments of the image 78 from the mixing module 28. The segments of the image may be a line of video data, a plurality of lines of video data, or a portion of a line of video data. The image segment monitoring module 50 determines, on a pixel by pixel basis, whether the pixel contains unfavorable brightness levels. Such a determination is made by the pixel comparison module 56. In essence, the pixel comparison module 56 monitors the brightness level of each pixel in the segment of the image. For example, module 56 monitors the Y value of YUV or YCbCr video data, to determine whether it exceeds a threshold. If so, the module 56 provides an indication to counter 60, which increments a count for this particular segment of the image. In addition, the pixel comparison module 56 provides a degree of unfavorability to the segment brightness processor 58. For example, if the current pixel only slightly exceeds a maximum desirable brightness level, the degree of unfavorability would be small. If, however, the pixel brightness substantially exceeds the threshold, the degree of unfavorability would be greater.

Based on the number of pixels within the segment of the image that have an unfavorable brightness and the degree of unfavorability for each of those pixels, the segment brightness processor 58 determines whether the particular segment of the image 78 has a favorable or unfavorable brightness. If the segment of the image has an unfavorable brightness, the segment brightness processor 58 also determines a degree of unfavorability 80. For example, if the segment of the image 78 is a line of video of a graphics image being displayed that has an average brightness in excess of ninety percent (90%), the segment brightness processor 58 would determine the line to have an unfavorable brightness and the degree of unfavorability would be relatively high. For example, if the threshold were set for a maximum brightness of seventy-five percent (75%), the degree of unfavorability would be linearly or nonlinearly based on the difference between the average brightness of ninety percent (90%) and the threshold of seventy-five percent (75%).

The image monitoring module 52, based on a plurality of indications of the contrast for a plurality of segments of the image, generates the contrast regulation signal 42. The image monitoring module 52 includes a processor 62, a look-up table 64, and/or logic processing circuitry 66 to generate the contrast regulation signal 42. Regardless of the specific implementation, the image monitoring module 52 generates the contrast regulation signal 42 based on the number of segments having an unfavorable brightness, a favorable brightness and the degree of unfavorability. For example, if only a single line in a frame of video has an unfavorable brightness, even if the degree of unfavorability is high, the module 52 would not generate the contrast regulation signal. But, as the number of lines having the unfavorable brightness increases and the degree of unfavorability is relatively high, the contrast regulation signal 42 would be generated, causing the contrast and corresponding brightness of the output image signals to be reduced. For example, if the first three lines of a graphics image have a very high brightness (e.g., >95%), the contrast regulation signal would be generated.

The contrast resetting module 54 monitors the favorable brightness and unfavorable brightness and degree of unfavorability for each segment of the image. If a predetermined number of segments pass having a favorable brightness, the contrast resetting module 54 produces an incremental contrast resetting signal 82, which is provided to the feedback module 30. As such, the contrast feedback signal is reduced thereby minimizing the reduction of the contrast of the incoming signals 36.

The feedback module 30 includes a compiler 68 and a limiting module 70. The compiler includes logic processing circuitry 72, a look-up table 74, and/or a processor 76. In essence, the compiler 68 receives, as inputs, the contrast regulation signal 42 and the incremental contrast resetting signal 82. Based on these inputs, via the logic circuitry 72, the processor 76 and/or the look-up table 74, the compiler 68 generates the contrast feedback signal 40. The contrast feedback signal 40 is provided through a limiting module 70 to the mixing module 28 such that the contrast feedback signal is limited to a particular maximum or minimum threshold. As one of average skill in the art would appreciate, the image control circuit 14 may further be operable to increase the contrast of images when the average brightness of the signals 36 is below a predetermined threshold.

Figure 3:
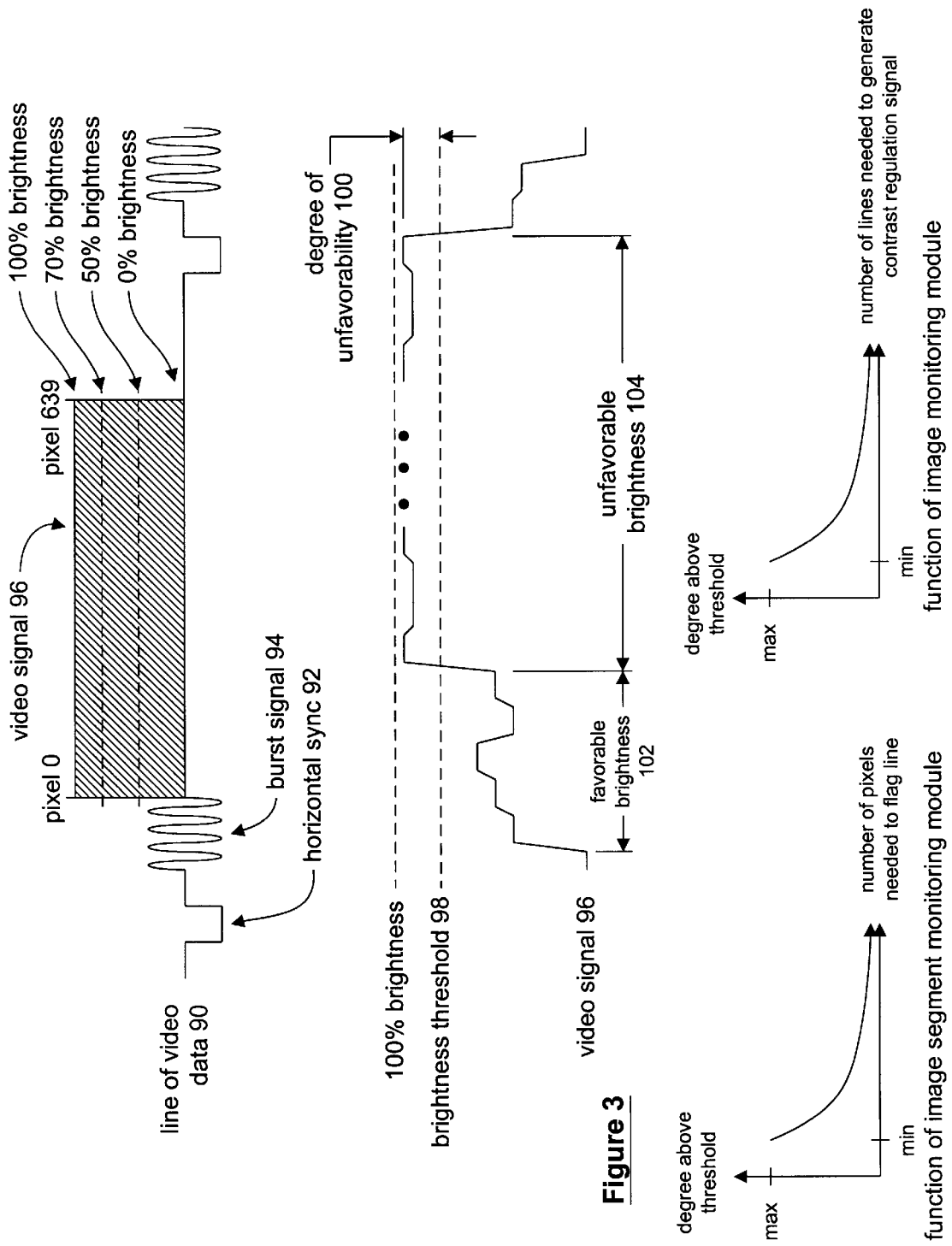
FIG. 3 illustrates a graphical representation of the contrast control function in accordance with the present invention.

FIG. 3 illustrates a graphical representation of the functionality of the image control circuit 14. As shown at the top portion of the figure, there is a line of video data 90. The line of video data includes a horizontal sync portion 92, a burst signal 94, and a video signal 96. The video signal 96 includes pixel data for pixel 0 through pixel 639. As such, the line of video data 90 is for a 640×480 display monitor. Also shown are various brightness levels of the video signal 98. As shown, the brightness levels are 0 percent, fifty percent (50%), seventy percent (70%), and one hundred percent (100%). Typically, television video signals will be in the range from thirty percent (30%) to seventy percent (70%) brightness, while graphics video signals will be above 70%. As previously mentioned, consumer grade televisions are designed to accommodate video signals that have a brightness in the thirty percent (30%) to seventy percent (70%) range. When the brightness of the video signal exceeds the 70% value, image become distorted as a result of blooming.

The next portion of FIG. 3 shows, on a pixel by pixel basis, a comparison of the video signal 96 with a brightness threshold 98. As shown, the first few pixels of the video signal 96 are below the brightness threshold 98 and therefore have a favorable brightness 102. The next portion of the video signal 96 has pixel values that have a brightness exceeding the brightness threshold 98. The magnitude in which the brightness of the pixels exceeds the brightness threshold determines the degree of unfavorability 100. As shown, these pixels have an unfavorable brightness 104.

The lower right portion of FIG. 3 illustrates a non-linear relationship between the degree above the threshold and the number of pixels to flag the line of the video data 90 as being unfavorable. As shown, if a minimum number of pixels exceed the threshold by the maximum value, the line will be flagged as being unfavorable. As the degree in which the brightness of the pixel exceeds the threshold decreases, the number of pixels needed to flag the line as being unfavorable increases. By utilizing the non-linear curve, the controlling of the contrast levels can be manipulated based on various display characteristics and human visual perception of unfavorable artifacts. As one of average skill in the art would appreciate, the non-linear relationship shown for the function of the image segment monitoring module is one of but many possible relationships between the degree above the threshold and the number of pixels needed to flag the line as being unfavorable. In addition, the relationship may be linear.

The next graph illustrates the function of the image monitoring module. The functionality varies in a non-linear fashion depending on the degree above the threshold of the video data 90 and the number of lines needed to generate the contrast regulation signal. As the degree in which a line exceeds the threshold, the number of lines needed to generate the contrast regulation signal decreases. In addition, the magnitude of the contrast regulation signal is very much dependent upon the degree with which the threshold is exceeded regardless of the number of lines exceeding the threshold provided the number of lines exceeds the minimum number.

Figure 4:
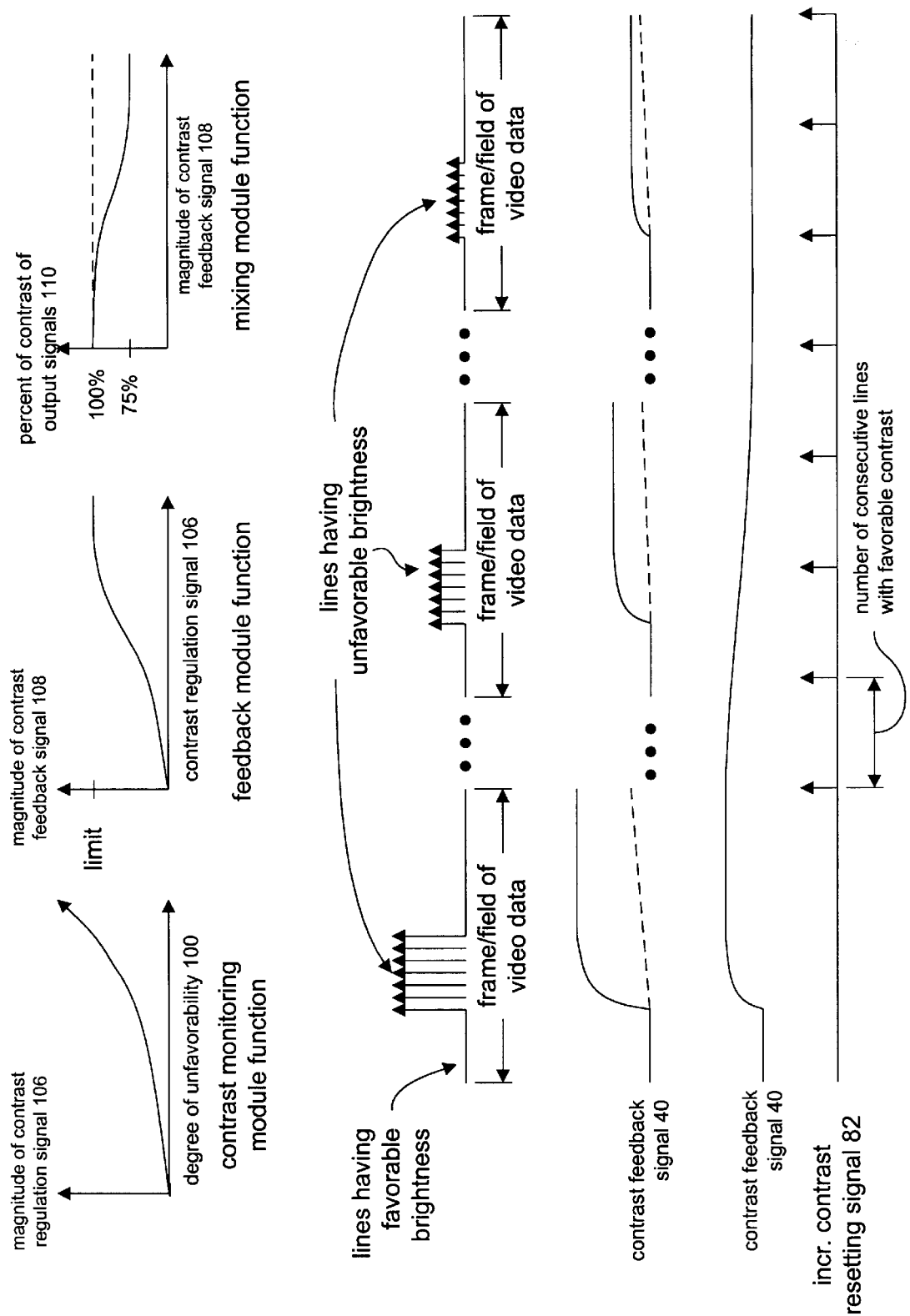
FIG. 4 illustrates a further graphical representation of the contrast control in accordance with the present invention.

FIG. 4 illustrates a continuation of the graphical representation of the functionality of the image control circuit 14. The graph shown in the upper-left portion of FIG. 4 illustrates the functionality of the brightness monitoring module. The brightness monitoring module functions in a non-linear relationship between the magnitude of the contrast regulations signal and the degree of unfavorability. As the degree of unfavorability 100 increases, the magnitude of the contrast regulation signal 106 increases in a non-linear fashion. Thus, once a determination is made that the contrast regulation signal needs to be generated, its magnitude is based on the degree of unfavorability of the lines that caused the minimum threshold to be exceeded.

The next graph illustrates the feedback module functionality. In this graph, the magnitude of the contrast feedback signal 108 is plotted against the contrast regulation signal 106. As shown, the magnitude of the contrast feedback signal 108 increases in a non-linear fashion with respect to the contrast regulation signal 106. Note that the magnitude of the contrast feedback signal will reach a limit as established by the limiting circuit 70.

The next graph illustrates the mixing module function. The graph plots the percentage of contrast of the output signal 110 versus the magnitude of the contrast feedback signal 108. As shown, if the magnitude of the contrast signal is 0, the brightness of the output signals will be at one hundred percent (100%) of the brightness value of the input signal. As the magnitude of the contrast feedback signal 108 increases, the percentage of the brightness of the output signals with respect to the brightness of the input signals will decrease to approximately seventy-five percent (75%) in a non-linear fashion.

The remaining graphical representations of FIG. 4 illustrate the various contrast feedback signal levels 40 and the incremental contrast resetting signal 82 being generated in comparison to the frames/fields of video data having lines which include unfavorable brightness. The first frame/field of video data includes a set of lines that have an unfavorable brightness with a large degree of unfavorability. As such, the contrast feedback signal 40 generated will have a relatively large magnitude thereby decreasing the percentage of the output brightness in comparison to the input brightness to the limit. Note that the contrast feedback signal may reach a steady state level over several frames having the large degree of unfavorability, which is represented by the dotted line.

If a certain number of lines, or frames, pass without any lines having an unfavorable brightness, the incremental contrast resetting signal 82 is generated. When this occurs, the contrast feedback signal 40 is reduced in magnitude. This is shown in the graph immediately above the incremental contrast resetting signal.

At some time later, another frame/field of video data includes lines having unfavorable brightness. In these lines, the degree of unfavorability is less than in the first frame shown. As such, the magnitude of the contrast feedback signal 40 will be proportional to the degree of unfavorability. Again note that the contrast feedback signal may be generated very rapidly within the frame of video data or slowly over several frames, which is represented by the dashed line. If a predetermined number of lines and/or frames pass without a line having an unfavorable brightness, the incremental contrast resetting signal 82 is generated thereby reducing the contrast feedback signal 40.

The third frame/field of video data of lines having unfavorable brightness are shown to have lines that have a relatively small degree of unfavorability. In this case, the contrast feedback signal 40 will be produced having a relatively small magnitude. As one of average skill in the art would appreciate, the implementation of the image control circuitry may be embodied in a variety of different circuits to perform the functions shown in FIGS. 3 and 4. One of average skill in the art will also appreciate that multiple other implementations may be derived from the teachings herein. For example, the relationship between the feedback signal and the contrast regulation signal may be linear or non-linear, have various relationships other than the ones shown in FIG. 3 and 4.

Figure 5:
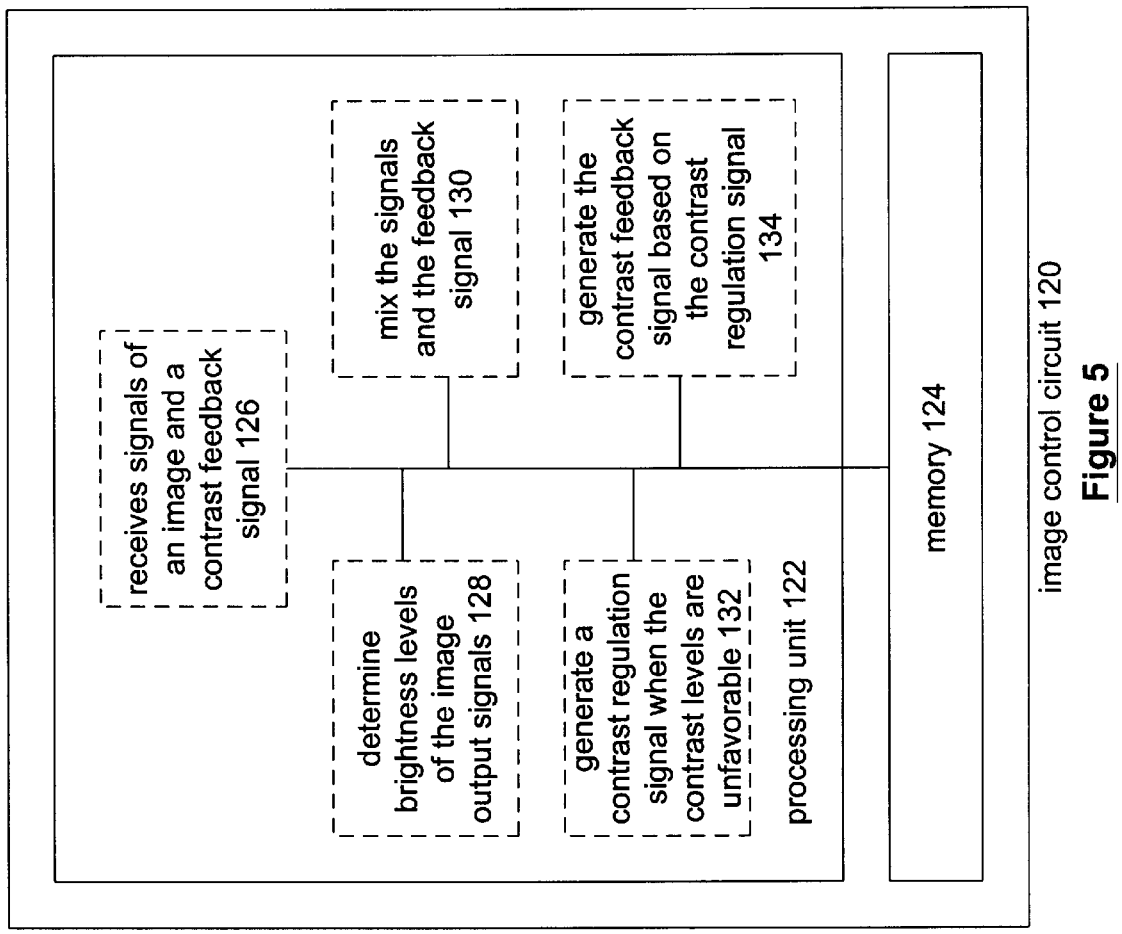
FIG. 5 illustrates a schematic block diagram of an image control circuit in accordance with the present invention.

FIG. 5 illustrates a schematic block diagram of an image control circuit 120. The image control circuit 120 includes a processing unit 122 and memory 124. The processing unit 122 may be a microprocessor, microcontroller, digital signal processor, microcomputer, central processing unit, and/or any other device that manipulates digital information based on programming instructions. The memory 124 may be read-only memory, random access memory, hard drive memory, floppy disk memory, CD memory, magnetic tape memory, zip drive memory, and/or any device that stores digital information.

The memory 124 stores programming instructions that, when executed by the processing unit 122, causes the processing unit to function as a plurality of circuits 126-134.

While executing the programming instructions, the processing unit functions as circuit 126 to receive signals of an image and a contrast feedback signal. The processing unit then functions as circuit 130 to mix the signals of the image and the feedback signal to produce the image output signals. The processing unit then functions as circuit 128 to determine contrast levels of the image output signals. The processing unit then functions as circuit 132 to generate a contrast regulation signal when the brightness levels of the image output signals are unfavorable. The processing unit then functions as circuit 134 to generate the contrast feedback signal based on the contrast regulation signal. The programming instructions stored in memory 124 and the execution thereof by processing unit 122 will be discussed in greater detail with reference to FIG. 6.

Figure 6:
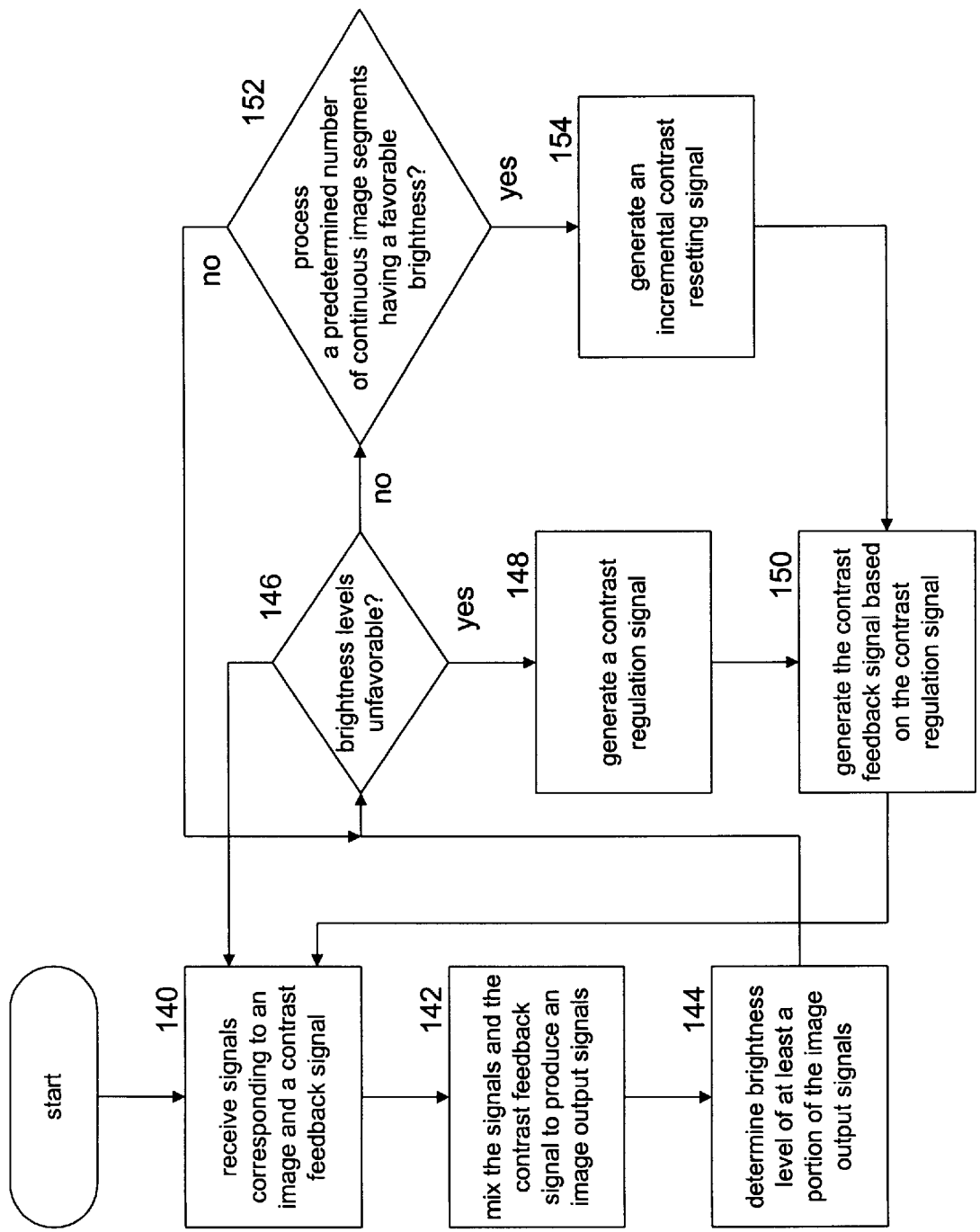
FIG. 6 illustrates a logic diagram of a method for controlling contrast of images in accordance with the present invention.

FIG. 6 illustrates a logic diagram of a method for controlling brightness of images when displayed on a video monitor. The process begins at step 140 where signals corresponding to an image and a contrast feedback signal are received. The process then proceeds to step 142 where the signals and the contrast feedback signal are mixed to produce image output signals. The process then proceeds to step 144 where the brightness level of at least a portion of the image output signals is determined. Such a determination may be based on whether a segment of the image has a favorable brightness or an unfavorable brightness. If it has an unfavorable contrast, a degree of unfavorability is also generated.

The process then proceeds to step 146 where a determination is made as to whether the brightness levels are unfavorable. Such a determination may be based on whether each pixel of the segment of the image has an unfavorable brightness or a favorable brightness. Then a determination is made as to whether a segment of the image has an unfavorable brightness or a favorable brightness based on the number of pixels having a favorable brightness and the number of pixels having an unfavorable brightness and the degree of unfavorability. In addition, the brightness levels of being unfavorable may be further determined on counting a number of occurrences of pixels of the segment of the image that have the unfavorable brightness. When the number of occurrences is below a predetermined value, a favorable brightness indication is generated for the line segment and when the number of occurrences equals or exceeds a predetermined value, an unfavorable brightness along with the degree of unfavorability is generated for the image. Further note that the unfavorable brightness may be based on a determination that the brightness levels exceeds a predetermined high brightness level or a determination that the brightness levels are below a predetermined low brightness level.

If the brightness levels are not unfavorable, the process proceeds to step 152. At step 152, a determination is made as to whether a predetermined number of continuous image segments have been processed having a favorable brightness. If not, the process reverts back to step 146. If so, the process proceeds to step 154 where an incremental contrast resetting signal is generated.

If the brightness levels are unfavorable, the process proceeds to step 148 where a contrast regulation signal is generated. Note that the contrast regulation signal is a dynamic signal that is generated based on the number of pixels in a segment having favorable brightness, the number of pixels having an unfavorable brightness, and/or the degree of unfavorability. The process then proceeds to step 150 where the contrast feedback signal is generated based on the contrast regulation signal. Note that the contrast feedback signal may be limited between a set of predefined limits. The process then reverts back to step 140.

The preceding discussion has presented a method and apparatus for controlling high average brightness images on a commercial grade television without the visual adverse effects of blooming. This is accomplished by providing a dynamic feedback path that regulates the brightness of outputted video signals. As such, incoming video signals may have any brightness level and be regulated accordingly. Further, incoming DVD signals will not be brightness limited provided their average brightness level is below the threshold set for the image control circuitry. Conversely, high brightness images such as graphic images will be dynamically regulated to reduce the intensity thereby reducing the adverse affects of blooming.

What is claimed:

1. An image control circuit for controlling brightness of images when displayed on a video monitor, the image control circuit comprises:

a mixing module operably coupled to receive signals corresponding to an image and a contrast feedback signal, wherein the mixing module mixes the signals of the image and the contrast feedback signal to produce image output signals;

a brightness monitoring module operably coupled to receive the image output signals, wherein the brightness monitoring module monitors brightness levels of the image output signals, and wherein the brightness monitoring module generates a contrast regulation signal when the brightness levels of the image output signals are unfavorable; and a feedback module operably coupled to the mixing module and the brightness monitoring module, wherein the feedback module generates the contrast feedback signal based on the contrast regulation signal such the image output signals are regulated to have favorable brightness levels.

2. The image control circuit of claim 1, wherein the mixing module multiples the signals of the image with the contrast feedback signal.

3. The image control circuit of claim 1, wherein the brightness monitoring module further comprises:

an image segment monitoring module operably coupled to receive signals corresponding to a segment of the image in a given period, wherein the image segment monitoring module determines whether the segment of the image has a favorable brightness or an unfavorable brightness and a degree of unfavorability; and an image monitoring module operably coupled to the image segment monitoring module, wherein the image monitoring module receives, for each of a plurality of image segments, a favorable brightness indication or an unfavorable brightness indication and the degree of unfavorability, and wherein the image monitoring module generates the contrast regulation signal based on the favorable brightness indications, the unfavorable brightness indications, and the degree of unfavorability of the plurality of image segments.

4. The image control circuit of claim 3, wherein the brightness monitoring circuit further comprises a contrast resetting module operably coupled to the image segment monitoring module and the feedback module, wherein the contrast resetting module generates an incremental contrast resetting signal when a predetermined number of substantially continuous image segments of the plurality of image segments have the favorable brightness.

5. The image control circuit of claim 4, wherein the feedback module further comprises:

a compiler operably coupled to receive the contrast regulation signal and the incremental contrast resetting signal to produce, therefrom, the contrast feedback signal; and a limiting module operably coupled to the compiling module, wherein the limiting module limits the contrast feedback signal between predefined limits.

6. The image control circuit of claim 5, wherein the compiler further comprises at least one of: a table look-up, a processor, and logic processing circuitry to generate the contrast feedback signal.

7. The image control circuit of claim 3, wherein the image segment monitoring module further comprises:

a pixel brightness comparison module operably coupled to determine whether each pixel of the segment of the image has the favorable brightness or the unfavorable brightness and the degree of unfavorability; and segment brightness processor operably coupled to receive the favorable brightness or the unfavorable brightness and the degree of unfavorability for each of the pixels of the segment of the image, wherein the segment brightness processor determines whether the segment of the image has the unfavorable brightness and the degree of unfavorability based on the favorable brightness or the unfavorable brightness and the degree of unfavorability for each of the pixels of the segment of the image.

8. The image control circuit of claim 7, wherein the image segment monitoring module further comprises a counter operably coupled to the pixel brightness comparison module, wherein the counter counts a number of occurrences of pixels of the segment of the image that have the unfavorable brightness, wherein, when the number of occurrences is below a predetermined value, the segment brightness processor generates the favorable brightness indication for the segment of the image, and wherein, when the number of occurrences equals or exceeds the predetermined value, the segment brightness processor generates the unfavorable brightness indication and the degree of unfavorability for the segment of the image.

9. The image control circuit of claim 3, wherein the image monitoring module further comprises at least one of: a table look-up, a processor, and logic processing circuitry to generate the contrast regulation signal based on the favorable brightness indication or the unfavorable brightness indication and the degree of unfavorability received for each of the plurality of image segments.

10. A method for controlling contrast of signals when displayed on a video monitor, the method comprises the steps of:

a) receiving signals corresponding to an image and a contrast feedback signal;

b) mixing the signals corresponding to the image and the contrast feedback signal to produce image output signals;

c) determining brightness levels of at least a portion of the image output signals;

d) generating a contrast regulation signal when the brightness levels are unfavorable; and e) generating the contrast feedback signal based on the contrast regulation signal.

11. The method of claim 10, wherein step (c) further comprises determining whether a segment of the image has a favorable brightness or an unfavorable brightness and a degree of unfavorability, wherein signals corresponding to the segment of the image were received in a given period; and step (d) further comprises generating the contrast regulation signal based on the number of segments having an unfavorable brightness, a favorable brightness, and the degree of unfavorability.

12. The method of claim 11 further comprises generating an incremental contrast resetting signal when a predetermined number of substantially continuous image segments of the plurality of image segments have the favorable brightness.

13. The method of claim 11 further comprises:

determining whether each pixel of the segment of the image has the favorable brightness or the unfavorable brightness and the degree of unfavorability; and determining whether the segment of the image has the unfavorable brightness and the degree of unfavorability based on the favorable brightness or the unfavorable brightness and the degree of unfavorability for each of the pixels of the segment of the image.

14. The method of claim 13 further comprises:

counting a number of occurrences of pixels of the segment of the image that have the unfavorable brightness;

when the number of occurrences is below a predetermined value, generating a favorable brightness indication for the segment of the image; and when the number of occurrences equals or exceeds the predetermined value, generating an unfavorable brightness indication and the degree of unfavorability for the segment of the image.

15. The method of claim 10, wherein step (e) further comprises limiting the contrast feedback signal between a set of predefined limits.

16. The method of claim 10, wherein step (d) further comprises determining the brightness levels are unfavorable based on at least one of a determination that the brightness levels exceeds a predetermined high brightness level and a determination that the brightness levels are exceeded by a predetermined low brightness level.

17. An image control circuit comprises:

a processing unit; and memory operably coupled to the processing unit, wherein the memory stores programming instructions that, when read by the processing unit, cause the processing unit to (a) receive signals corresponding to an image and a contrast feedback signal; (b) mix the signals corresponding to the image and the contrast feedback signal to produce image output signals; (c) determine brightness levels of at least a portion of the image output signals; (d) generate a contrast regulation signal when the brightness levels are unfavorable; and (e) generate the contrast feedback signal based on the contrast regulation signal.

18. The image control circuit of claim 17, wherein the memory further comprises programming instructions that cause the processing unit to determine whether a segment of the image has a favorable brightness or an unfavorable brightness and a degree of unfavorability, wherein signals corresponding to the segment of the image were received in a given period; and generate the contrast regulation signal based on the number of segments having an unfavorable brightness, a favorable brightness, and the degree of unfavorability.

19. The image control circuit of claim 18, wherein the memory further comprises programming instructions that cause the processing unit to generate an incremental contrast resetting signal when a predetermined number of substantially continuous image segments of the plurality of image segments have the favorable brightness.

20. The image control circuit of claim 18, wherein the memory further comprises programming instructions that cause the processing unit to:

determine whether each pixel of the segment of the image has the favorable brightness or the unfavorable brightness and the degree of unfavorability; and determine whether the segment of the image has the unfavorable brightness and the degree of unfavorability based on the favorable brightness or the unfavorable brightness and the degree of unfavorability for each of the pixels of the segment of the image.

21. The image control circuit of claim 20, wherein the memory further comprises programming instructions that cause the processing unit to:

count a number of occurrences of pixels of the segment of the image that have the unfavorable brightness;

generate a favorable brightness indication for the segment of the image when the number of occurrences is below a predetermined value; and generate an unfavorable brightness indication and the degree of unfavorability for the segment of the image when the number of occurrences equals or exceeds the predetermined value.

22. The image control circuit of claim 17, wherein the memory further comprises programming instructions that cause the processing unit to limit the contrast feedback signal between a set of predefined limits.

23. A video monitoring system comprises:

video receiving circuitry operably coupled to receive input video signals and produce, therefrom, display formatted video signals that correspond to an image;

an image control circuit operably coupled the video receiving circuitry, wherein the image control circuit includes:

a mixing module operably coupled to receive the display formatted video signals and a contrast feedback signal, wherein the mixing module mixes the display formatted video signals and the contrast feedback signal to produce image output signals;

a brightness monitoring module operably coupled to receive the image output signals, wherein the brightness monitoring module monitors brightness levels of the image output signals, and wherein the brightness monitoring module generates a contrast regulation signal when the brightness levels of the image output signals are unfavorable; and a feedback module operably coupled to the mixing module and the contrast monitoring module, wherein the feedback module generates the contrast feedback signal based on the contrast regulation signal such the image output signals are regulated to have favorable brightness levels; and display device operably coupled to receive, and subsequently display, the image output signals.

24. The video monitoring system of claim 23, wherein the brightness monitoring module further comprises:

an image segment monitoring module operably coupled to receive signals corresponding to a segment of the image in a given period, wherein the image segment monitoring module determines whether the segment of the image has a favorable brightness or an unfavorable brightness and a degree of unfavorability; and an image monitoring module operably coupled to the image segment monitoring module, wherein the image monitoring module receives, for each of a plurality of image segments, a favorable brightness indication or an unfavorable brightness indication and the degree of unfavorability, and wherein the image monitoring module generates the contrast regulation signal based on the favorable brightness indications, the unfavorable brightness indications, and the degree of unfavorability of the plurality of image segments.

25. The video monitoring system of claim 24, wherein the brightness monitoring module further comprises a contrast resetting module operably coupled to the image segment monitoring module and the feedback module, wherein the contrast resetting module generates an incremental contrast resetting signal when a predetermined number of substantially continuous image segments of the plurality of image segments have the favorable brightness.

26. The video monitoring system of claim 25, wherein the feedback module further comprises:

a compiler operably coupled to receive the contrast regulation signal and the incremental contrast resetting signal to produce, therefrom, the contrast feedback signal; and a limiting module operably coupled to the compiling module, wherein the limiting module limits the contrast feedback signal between predefined limits.

27. The video monitoring system of claim 26, wherein the compiler further comprises at least one of: a table look-up, a processor, and logic processing circuitry to generate the contrast feedback signal.

28. The video monitoring system of claim 24, wherein the image segment monitoring module further comprises:

a pixel contrast comparison module operably coupled to determine whether each pixel of the segment of the image has the favorable brightness or the unfavorable brightness and the degree of unfavorability; and segment contrast processor operably coupled to receive the favorable brightness or the unfavorable brightness and the degree of unfavorability for each of the pixels of the segment of the image, wherein the segment contrast processor determines whether the segment of the image has the unfavorable brightness and the degree of unfavorability based on the favorable brightness or the unfavorable brightness and the degree of unfavorability for each of the pixels of the segment of the image.

29. The video monitoring system of claim 28, wherein the image segment monitoring module further comprises a counter operably coupled to the pixel contrast comparison module, wherein the counter counts a number of occurrences of pixels of the segment of the image that have the unfavorable brightness, wherein, when the number of occurrences is below a predetermined value, the segment contrast processor generates the favorable brightness indication for the segment of the image, and wherein, when the number of occurrences equals or exceeds the predetermined value, the segment contrast processor generates the unfavorable brightness indication and the degree of unfavorability for the segment of the image.

30. The video monitoring system of claim 24, wherein the image monitoring module further comprises at least one of: a table look-up, a processor, and logic processing circuitry to generate the contrast regulation signal based on the favorable brightness indication or the unfavorable brightness indication and the degree of unfavorability received for each of the plurality of image segments.

* * * * *